UNITED STATES PATENT OFFICE.

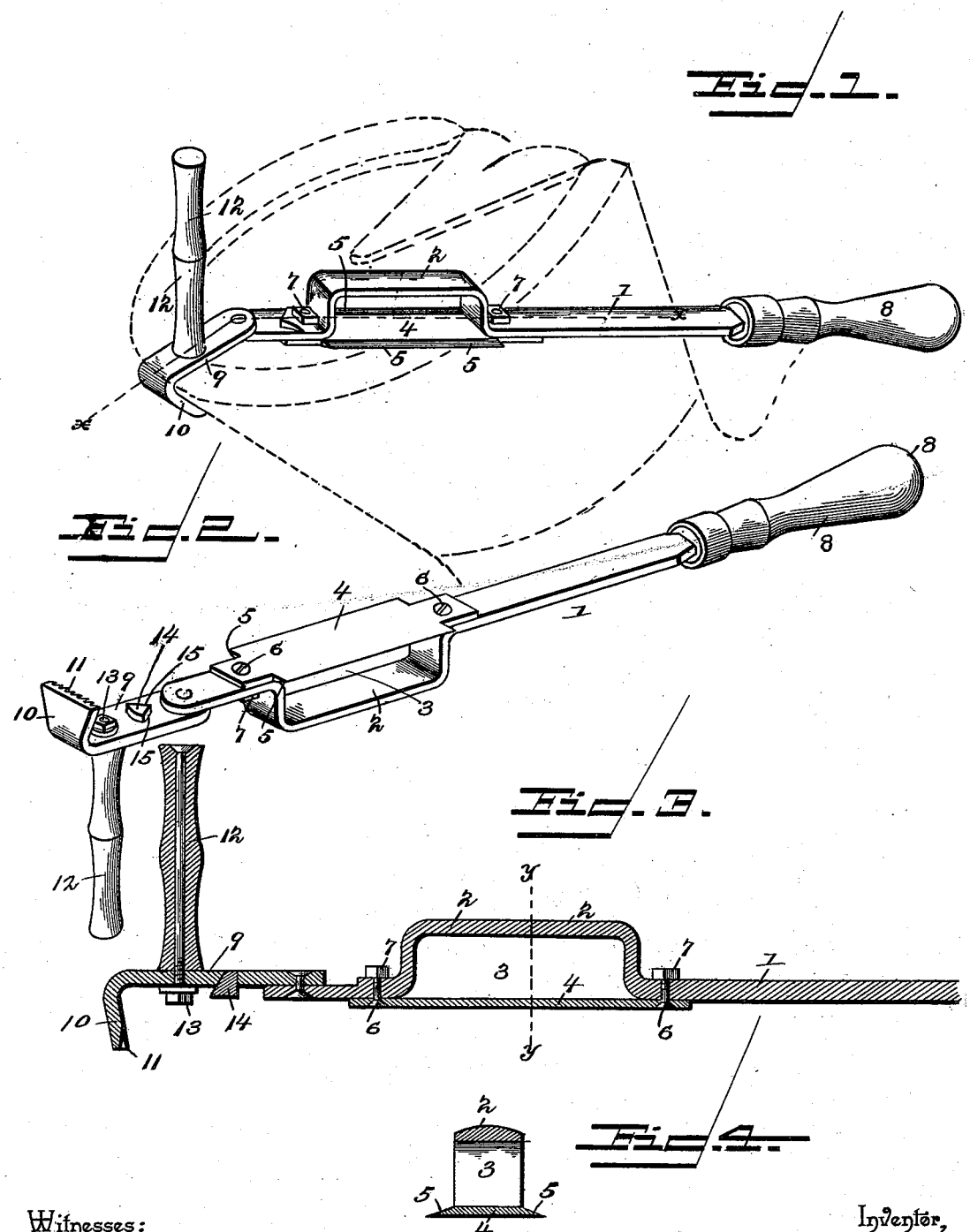

JOB MATTESON, OF SOUTH HARTFORD, ASSIGNOR OF ONE-HALF TO FRANK E. BOYNTON, OF HEBRON, NEW YORK.

HOOF TRIMMER OR PARER.

SPECIFICATION forming part of Letters Patent No. 504,400, dated September 5, 1893.

Application filed April 13, 1893. Serial No. 470,188. (No model.)

*To all whom it may concern:*

Be it known that I, JOB MATTESON, a citizen of the United States, residing at South Hartford, in the county of Washington and State of New York, have invented a new and useful Hoof Trimmer or Parer, of which the following is a specification.

This invention relates to hoof trimmers or parers, and has for its object to simplify the construction of such class of devices and render the same strong and durable, easily handled and quickly operated, and which is comparatively inexpensive to manufacture.

With these and other objects in view the invention consists of the construction and arrangement of the parts as will be hereinafter more fully described and claimed.

In the drawings: Figure 1 is a perspective view of the improved device. Fig. 2 is a similar view of the improved device reversed. Fig. 3 is a sectional view on the line $x$—$x$ of Fig. 1. Fig. 4 is a section on the line $y$—$y$ of Fig. 3.

Similar numerals of reference indicate corresponding parts in the several figures of the drawings.

Referring to the drawings, the numeral 1 designates a knife-bar that has a loop or bend 2 in the body thereof that projects laterally therefrom and forms a side opening 3. Removably bolted to the said knife-bar 1, and spanning or extending across the opening 3, is a double knife 4, having oppositely-sharpened edges 5. The said knife 4 is held to the knife-bar 1 by two screws 6, whose heads are countersunk in the knife and have nuts 7 on the ends thereof, and by means of which the said knife may be removed for the purposes of sharpening or other manipulation. It will be seen that the loop or bend 2, of the knife-bar 1, forms a convenient opening through which the trimmings or parings from the hoof may pass without clogging the knife.

To the rear end of the knife-bar 1 is secured a suitable handle 8, by which the device may be held while the paring or trimming operation is being pursued. To the front end of the knife-bar 1, and against one side, is pivotally connected a grip-bar 9, that has an outer angularly-bent end 10 with an inner corrugated or roughened surface 11 to prevent slipping on the hoof. To the grip-bar is removably connected a handle 12, by means of a bolt 13 that extends therethrough, said handle 12 standing at a right angle to the knife-bar 1 and being employed to hold the said grip-bar, and the lower angularly-bent end thereof relatively to the hoof being operated upon. Inside the point where the handle 12 is applied to the grip-bar, the latter is formed or suitably provided with a stop or projection 14, of proper form, but preferably with upper oppositely-inclined sides 15, as shown, and is employed to prevent the knife in either of its positions from striking the grip-bar and dulling the edge thereof.

In operating the device, the outer angularly-bent end of the grip-bar 9 is placed upon the rounded part of the toe of the hoof, and the knife-bar, which is virtually a lever, is forced downward to the toe, thereby causing the knife to trim or pare the adjacent part of the hoof; the grip-bar is then positioned on the inside of the hoof to clear the toe of the latter, and the lever is then forced downward to cause the knife to trim the toe; the grip-bar is then again placed in position on the toe part of the hoof, but previously the knife-bar is reversed and the inside part of the hoof may be readily trimmed or pared. The grip-bar is then placed on the side of the hoof, and the knife-bar, with its knife, is forced backward to the frog and repeated on opposite sides to evenly trim or pare the said frog, when the hoof will be ready to receive the shoe.

The leverage exerted in operating the improved form of the device, as herein set forth, is an important advantage, because only a small amount of power is required to attain sufficient pressure on the knife to acquire the requisite paring or trimming of the hoof operated upon. It will be seen that a sweeping cut can at once be made, thereby saving time, and it also acts uniformly and evenly at all points.

Changes in the form, proportion, and the minor details of construction may be resorted to without departing from the principle or sacrificing any of the advantages of this invention.

Having described the invention, what is claimed as new is—

1. In a hoof trimmer or parer, the combination of a knife-bar having an offset loop or bend therein to form an opening, a knife secured to said knife-bar and spanning the said opening thereof, and having an open space at its inner face to prevent clogging and a grip-bar pivoted to the outer end of said knife-bar, substantially as described.

2. In a hoof trimmer or parer, the combination of a knife-bar having a handle connected thereto, a double-edged knife secured to the said knife-bar, a grip-bar pivotally connected to the outer end of said knife-bar and having an outer bent end with an inner corrugated or roughened surface, and a handle secured to the said grip-bar, substantially as described.

3. In a hoof trimmer or parer, the combination of a knife-bar having a handle connected thereto, a double-edged knife removably secured to the said knife-bar, and a grip-bar having an outer angularly-bent end with an inner corrugated or roughened surface and a handle, said grip-bar being also provided with a stop or projection to limit the movement of the knife-bar, substantially as described.

4. In a hoof trimmer or parer, the combination of a grip bar having an outer angularly bent end to engage a hoof and provided with a projection or stop, a knife bar pivotally attached to the grip bar and provided with a blade having cutting edges at opposite sides of the knife bar, the latter being arranged to engage the projection or stop to prevent the blade coming in contact with the grip bar, and a handle secured to the grip bar and arranged perpendicular to the knife bar, substantially as described.

In testimony that I claim the foregoing as my own I have hereto affixed my signature in the presence of two witnesses.

JOB MATTESON.

Witnesses:
JOHN SHAW,
R. M. STEVENSON.